(No Model.)

H. K. PORTER.
EXTENSION TOOL FOR PLANERS.

No. 382,268. Patented May 1, 1888.

WITNESSES. INVENTOR.
Eugene Humphrey Henry K. Porter
Eben Hutchinson T. W. Porter, Atty

UNITED STATES PATENT OFFICE.

HENRY K. PORTER, OF BOSTON, ASSIGNOR OF ONE-HALF TO ANNIE G. PORTER AND T. W. PORTER, BOTH OF CHELSEA, MASSACHUSETTS.

EXTENSION-TOOL FOR PLANERS.

SPECIFICATION forming part of Letters Patent No. 382,268, dated May 1, 1888.

Application filed July 5, 1887. Serial No. 243,327. (No model.)

*To all whom it may concern:*

Be it known that I, HENRY K. PORTER, of Boston, in the county of Suffolk and State of Massachusetts, have invented a new and useful Improvement in Extension Planer-Tools, which will, in connection with the accompanying drawings, be hereinafter fully described, and specifically defined in the appended claims.

Figures 1, 2:
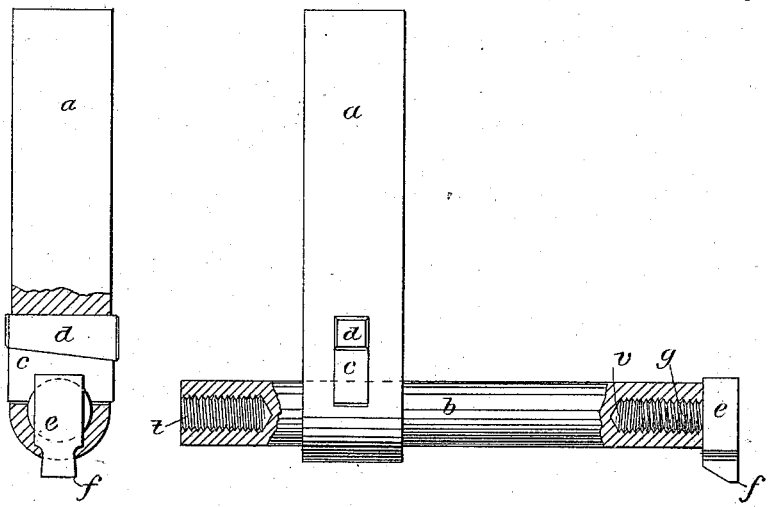
Figures 3, 4:
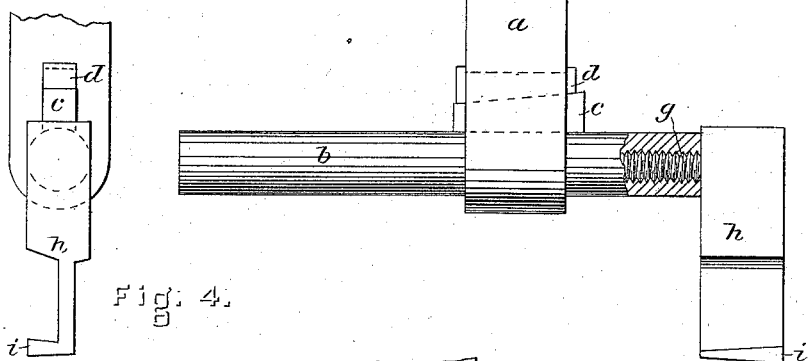
Figures 5, 6:
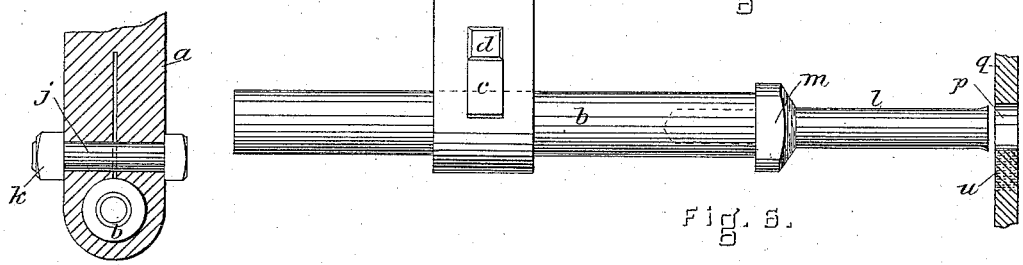

In said drawings, Figure 1 is a side elevation of a planer-tool embodying my invention. Fig. 2 is an elevation taken at the right of Fig. 1. Fig. 3 is a view similar to Fig. 1, but with certain changes, to be referred to. Fig. 4 is an elevation taken at the right of Fig. 3. Fig. 5 shows a modification; and Fig. 6 is a view like Fig. 1, but showing a different cutting-tool.

My invention relates to a device having a stock adapted to be secured in the tool-clamp of metal-planers and provided with a cylindrical bar adapted to be lineally adjusted and locked in place in said stock, and which has an axial threaded hole in each end for attachment of the cutters to be employed, and a peculiarly-formed cutter to be secured in said bar, all as will be hereinafter fully described, and pointed out in the claims.

Referring again to said drawings, *a* represents the stock, which is rectangular in cross-section and of a diameter and length adapted to the size of the planer in which it is to be used, said stock being secured in the tool clamp or post of the planer in the same manner that any tool is secured therein. A cylindrical bar, *b*, is fitted closely, but to slide, in a transverse passage through the stock, as near as practicable to its lower end, and is locked in position in the stock either by a cross-key, *d*, and gib *c*, as shown in Figs. 1, 2, and 6, or by arranging the key and gib lengthwise the bar, as shown in Figs. 3 and 4, or by splitting the stock and employing a locking-bolt, *j*, having a threaded nut, *k*, as shown in Fig. 5, these several methods of locking bar *b* in place in the stock being well-known equivalents; but the method shown in Figs. 1, 2, and 6 I deem much preferable to the others for this purpose.

In the respective ends of bar *b* are formed the axial threaded holes *t v*, the former having a left-hand and the latter a right-hand thread, as shown in Fig. 1.

In Figs. 1 and 2 is shown a cutting-tool, *e*, formed with an integral threaded stem, *g*, fitted to the thread in hole *v*, as shown.

In Figs. 3 and 4 a side tool, *h*, is shown, it having a cutting-edge, *i*, and being secured in the left-hand threaded hole in bar *b* by its integral stem *g*, threaded to correspond with the thread in hole *t* in the bar.

In Fig. 5 is shown a cylindrical cutting-tool, *l*, formed with a solid shoulder, *m*, and a stem, threaded in bar *b*, as described in reference to cutters *e h*.

A cutter like *e*, which is used for slotting, cutting keyways, and similar purposes, may have its stem *g* threaded either right or left handed, as the resisting pressure upon the tool when in the cut has the same inclination to rotate it in one direction as the other, and hence it is not liable to work loose in bar *b*; and the same is true of cutter *l*, one of the uses of which is indicated by piece *q*, in which is a hole, *p*, of a size for cutter *l* to pass through, and by the cutting action of which said hole may be gradually elongated to a slot, as indicated by dotted lines at *u*; but when side tools, either like *h* or of other types, are employed it is indispensable that the direction of the thread on stem *g* be such that the pressure upon the cutting-point when working shall tend to turn stem *g* inward, and thus hold the body of the tool solidly against the end of bar *b*; and as side tools must be both "rights" and "lefts," so as to cut in either direction from the line of reciprocation by means of the cross-feed of the planer, hence the indispensable requisite of having in one end of bar *b* a hole with a right-hand thread and in the other a hole with a left-hand thread. It is also requisite that bar *b* be cylindrical, in order that after the cutter has been brought solidly against the end of the bar, then by rotating the bar in stock *a*, the cutter may be adjusted to the proper position to perform its work in any given instance. Bar *b* may also be adjusted to extend from stock *a* any desired distance, according to the work which the cutter in the bar is to perform, and the slight extension of stock *a* below the bar *b* and the fact that the cutting-tool need extend laterally from bar *b* only the distance which the tool is to cut renders it practicable to perform work in interior positions with this tool that could not be done with those of usual construction.

Instead of having both a right and left hand threaded hole in bar *b*, two bars may be employed, one having a right and the other a left hand threaded hole; but such bars would be but the equivalent of the bar herein shown and described.

I claim as my invention—

1. A planer extension-tool having stock *a*, adapted to be locked in the tool-holding clamp of a planer and having a circular transverse passage therethrough near one end, cylindrical bar *b*, having axial and diversely threaded holes in its ends and fitted adjustably in said transverse passage in the stock, so that it may be adjusted both by rotation and lineal movement in the stock, and means, substantially as described, for rigidly locking the bar in the stock when adjusted therein, substantially as specified.

2. A metal-cutting tool formed with a body, a screw-threaded stem formed integrally with said body and with its axis at right angles to the longitudinal line of said body, and an operative cutting-edge formed upon said body with the line of said edge at right angles to the axis of said stem, substantially as specified.

3. An extension planer-tool formed of stock *a*, adapted to be locked in the tool-clamp of the planer, cylindrical bar *b*, fitted transversely and adjustably in said stock near one end thereof and having axial holes right and left hand threaded, and means, substantially as specified, for rigidly locking said bar in the stock when properly adjusted therein, and a cutter formed with a threaded stem fitted in said bar, a body to serve as a shoulder to abut against said bar, and an operative cutting-edge, all substantially as specified.

4. An extension planer-tool having a stock formed and adapted to be locked in the tool-clamp of the planer, a cylindrical bar fitted transversely and adjustably in said stock near one end thereof and axially threaded, and means, substantially as described, for locking said bar, and a cutter formed with a threaded stem fitted in said bar, with a body to abut against the end of the bar, and a cutting-point, substantially as specified.

HENRY K. PORTER.

Witnesses:
EUGENE HUMPHREY,
T. W. PORTER.